Sept. 30, 1969   J. R. BEATTIE   3,469,963
METHOD OF AND APPARATUS FOR TOUGHENING GLASS
Filed Dec. 6, 1965   3 Sheets-Sheet 1

Inventor
J. R. Beattie

Sept. 30, 1969        J. R. BEATTIE        3,469,963
METHOD OF AND APPARATUS FOR TOUGHENING GLASS
Filed Dec. 6, 1965                        3 Sheets-Sheet 2
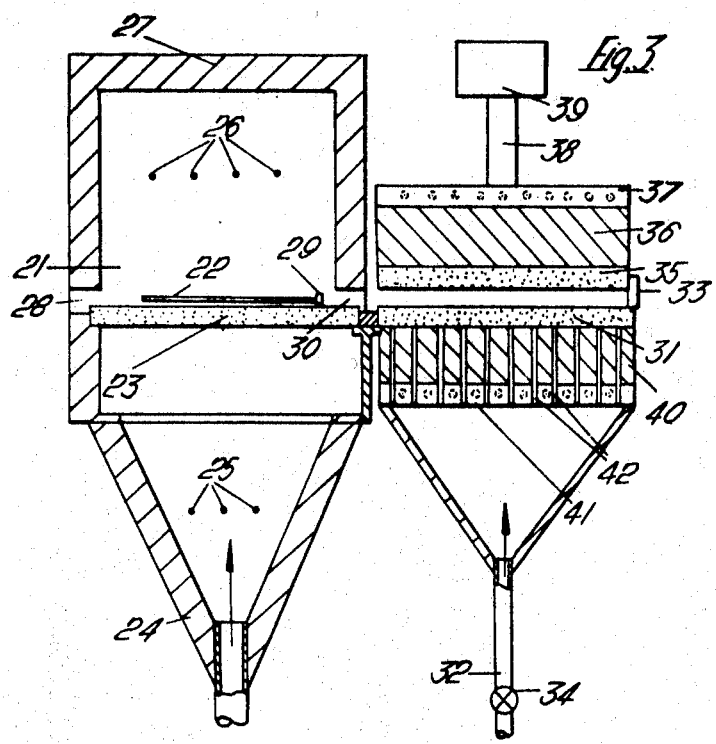
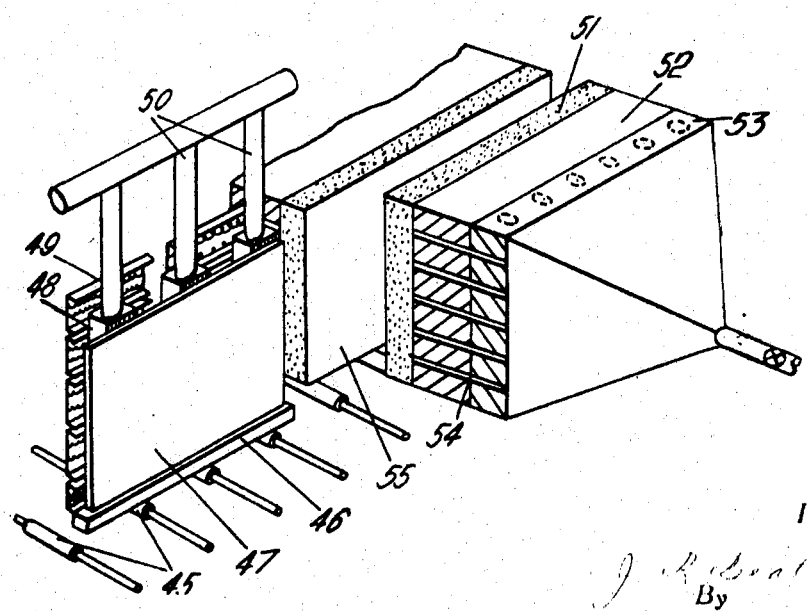
Inventor
J. R. Beattie
By
Morrison, Kennedy & ..., Attorneys Sept. 30, 1969   J. R. BEATTIE   3,469,963
METHOD OF AND APPARATUS FOR TOUGHENING GLASS
Filed Dec. 6, 1965   3 Sheets-Sheet 3

Inventor
J. R. Beattie
By
Morrison, Kennedy & Campbell
Attorneys

United States Patent Office 3,469,963
Patented Sept. 30, 1969

3,469,963
METHOD OF AND APPARATUS FOR TOUGHENING GLASS
John Reginald Beattie, Maghull, near Liverpool, England, assignor to Pilkington Brothers Limited, Liverpool, Lancashire, England, a corporation of Great Britain
Filed Dec. 6, 1965, Ser. No. 511,784
Claims priority, application Great Britain, Dec. 9, 1964, 50,157/64
Int. Cl. C03b 27/00
U.S. Cl. 65—115                                9 Claims

ABSTRACT OF THE DISCLOSURE

A hot glass sheet is toughened by contacting its surfaces with opposed bodies of graphite-containing heat-conducting material through which heat is extracted by maintaining a reference temperature at the remote surfaces of those bodies.

---

Figure 1:
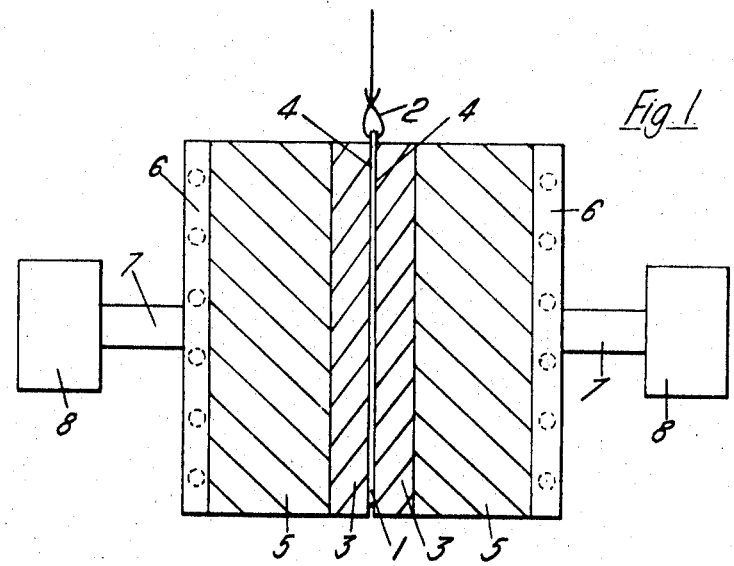

This invention relates to methods of toughening glass and more particularly to methods of and apparatus for toughening glass in sheet form.

The conventional processes in use at this time for toughening glass involve the heating of the glass to a temperature above the strain point of the glass, followed by the subjection of the surfaces of the heated glass to the action of a chilling medium, usually cold air, to introduce a difference in temperature between the surfaces and the interior of the glass while the glass is cooled through its strain point.

These conventional processes are subject to the disadvantage that the raising of the degree of toughening of the glass by increasing the pressure at which the gaseous chilling medium is directed at the glass is liable to produce marking of the surface of the glass and also there is an effective upper limit on the degree of toughening which can be introduced into a glass article because of the difficulty of effectively removing the expended chilling medium from the region of the glass article being toughened. This expended chilling medium, which is the gas which has been heated by contact with the surfaces of the glass, is a poor conductor of heat and tends to blanket the hot glass surfaces from further chilling medium which is directed towards the glass. These difficulties result in it being extremely difficult to toughen thin glass, i.e. glass of 1/8″ thickness and less, by conventional processes and it is almost impossible to obtain a high degree of toughening in thin glass by these processes.

It is a main object of the present invention to provide an alternative method of toughening glass in sheet form which is not subject to these disadvantages.

The method of toughening glass in sheet form according to the invention is based on the concept of conducting heat away from the surfaces of the glass sheet through a stationary medium at a necesary rate to achieve a desired degree of toughening in the glass sheet. This concept is carried out by bringing a graphite-containing heat-conducting material which is capable of contacting the glass surface, at the temperature from which the glass is quenched, without marking the glass surface, into thermal contact with the glass, that is to say sufficient physical contact to enable heat to be conducted from the surface area of the glass sheet through the heat-conducting material.

According to the present invention there is provided a method of toughening glass in sheet form comprising the steps of bringing the surfaces of a glass sheet at a temperature above the strain point of the glass into thermal contact with a graphite-containing heat-conducting material, capable of contacting the glass surface at the said temperature without impairing the quality of the glass surface, and maintaining a reference temperature to control the rate of heat flow through the graphite-containing heat-conducting material thereby to establish a desired temperature difference between the surfaces of the glass and an interior portion of the glass when the glass is cooled through its strain point.

The surfaces of the graphite-containing heat-conducting material which contact the glass surfaces are substantially smooth surfaces, that is to say surfaces which are formed to appear planar as opposed to deliberately uneven surfaces, for example corrugated surfaces.

Preferably the process according to the present invention is carried out using, in order to provide the surfaces which contact the surfaces of the glass sheet, slabs of graphite, the surfaces of which are substantially smooth so that they will not undesirably mark the surfaces of the glass sheet. Conveniently the contacting surface of the graphite is a machined surface.

According to this aspect, therefore, the present invention provides a method of toughening glass in sheet form comprising the steps of bringing the surfaces of a glass sheet at a temperature above the strain point of the glass into thermal contact with the substantially smooth surfaces of respective slabs of graphite, and maintaining a desired reference temperature to control the rate of heat flow through the graphite slabs thereby to establish a desired temperature difference between the surfaces of the glass and an interior portion of the glass when the glass is cooled through its strain point.

The rate of conduction of heat from the glass sheet through the heat-conducting material is dependent on a number of factors, including the pressure with which the surfaces of the heat-conducting material are applied to the surfaces of the glass sheet. It is desired, however, that the pressure with which the heat-conducting material is applied to the glass sheet be kept comparatively light to reduce the possibility of marking the surfaces of the glass sheet, for example the contacting surfaces are preferably applied to the glass at a pressure of from 2 to 4 lbs. per sq. inch.

Assuming that a constant applied pressure within this range is used, the rate of conduction of heat from the glass sheet, that is to say the rate of heat abstraction from the glass, is dependent on the reference temperature maintained adjacent to the rear or noncontacting surface of the heat-conducting material, the thickness and nature of the material between the contacting surface of the heat-conducting material and the reference temperature, and the temperature of the contacting surfaces themselves.

The whole of the material between the contacting surfaces and the reference temperature may be the same heat-conducting material, for example graphite, or it may be comprised by more than one heat-conducting material. Advantageously, however, a metal block is provided behind the slab of heat-conducting material, and this metal block provides a good support for the slab of heat-conducting material and enables it to retain its shape.

The slab of heat-conducting material is then preferably about 1 cm. in thickness and the preferred metal, to use as the block in aluminium, although other metals, for example copper, silver or steel, may be used alternatively. The reference temperature is then provided in or adjacent to the surface of the metal block remote from the slab of heat-conducting material.

According to this aspect, therefore, the present invention provides a method of toughening glass in sheet form comprising the steps of bringing the surfaces of a glass sheet at a temperature above the strain point of the glass into thermal contact with a graphite-containing heat-conducting material capable of contacting the glass surface at the said temperature without impairing the quality of the glass surface and having substantially smooth contacting surfaces, conducting heat from the glass sheet through the said graphite-containing heat-conducting material and a metal adjacent thereto at a rate controlled by a reference temperature maintained on the side of the metal remote from the glass sheet so that the desired temperature difference between the surfaces of the glass and an interior portion of the glass is established and maintained while the glass is cooled through its strain point.

Further in accordance with one aspect of the present invention, the contacting surfaces of the heat-conducting material are initially brought into light pressure contact (2 to 4 lbs./sq. inch) with the surfaces of the glass sheet, and then, after the surfaces of the glass sheet have cooled to a lower temperature, for example 500° C., at which the surfaces of the glass are set and are not deformable, the surfaces of the heat-conducting material are applied to the glass at higher pressures, for example 15 to 20 lbs./sq. inch. By increasing the pressure between the surfaces of the glass and the surfaces of the heat-conducting material in this way, an increased degree of toughening in the glass sheet may be obtained without running any risk of marring the surface of the glass.

Also in accordance with another aspect of the present invention, the surfaces of heat-conducting material are applied to a part only of a heated glass sheet at one predetermined pressure, whereby the said part of the glass sheet is toughened to a desired degree and a reserved zone of a different, preferably a lesser, degree of toughening, is obtained in the other part of the glass sheet.

A lesser degree of toughening in the said other part of the glass sheet may be obtained by bringing surfaces of heat-conducting material close to the surfaces of the said other part of the glass sheet so that the surfaces of the said other part of the glass sheet are not in pressure contact with the surfaces of heat-conducting material.

Alternatively surfaces of heat-conducting material may be applied to the said other part of the glass sheet at a pressure lighter than the said predetermined pressure, whereby a reserved zone of a lesser degree of toughening is obtained in that part of the glass sheet, to which the heat-conducting material is applied at the lighter pressure.

The production of a toughened glass sheet with a reserved zone in accordance with this aspect of the present invention is desirably achieved by making a heat-conducting surface with two distinct levels, each level being in itself a substantially smooth surface, and applying a uniform pressure to the heat-conducting material as a whole, whereby the two levels of the heat-conducting surfaces are applied to the glass at different pressures or even with no pressure between the glass and a recessed part of the heat-conducting surface. The difference between the levels of the different parts of the heat-conducting surface is advantageously of the order of a few thousandths of an inch.

As an alternative to the use of graphite slabs with smooth contacting surfaces for contacting the heated glass sheet, there may be used as the graphite-containing heat-conducting material a layer of glass fibre cloth impregnated and coated with a dispersion of graphite, and according to this aspect of the invention, therefore, there is provided a method of toughening glass in sheet form comprising the steps of bringing the surfaces of a glass sheet at a temperature above the strain point of the glass into thermal contact with the substantially smooth surfaces of a glass fibre cloth coated and impregnated with graphite, the glass fibre cloth being supported in heat-conducting relation with a slab or block of heat-conducting material having a higher thermal conductivity than the said glass fibre cloth, and maintaining a desired reference temperature to control the rate of heat flow through the glass fibre cloth and the supporting material or materials, thereby to establish a desired temperature difference between the surfaces of the glass and an interior portion of the glass when the glass is cooled to its strain point.

The glass fibre cloth impregnated and coated with graphite may be used in cases where the conditions are such that there is a risk of the glass sheet shattering when contacted by surfaces of graphite alone. The thermal conductivity of the glass fibre cloth impregnated with graphite tends to be approximately the thermal conductivity of glass rather than of the graphite, so that the glass fibre cloth which is impregnated and coated with graphite has a lower thermal conductivity than the graphite slab.

Equally, the manufacture of a glass sheet, a part or parts of which are toughened to one degree and other part or parts of which are toughened to a lesser degree, may be facilitated by making a surface which is itself planar, or substantially so, but which is constituted by graphite itself where a higher degree of toughening is desired and by glass fibre cloth impregnated with graphite where a lesser degree of toughening is required.

According to this aspect, therefore, there is provided by the present invention a method of toughening glass in sheet form comprising the steps of bringing the surfaces of a glass sheet at a temperature above the strain point of the glass into thermal contact with a surface of heat-conducting material capable of contacting the glass surface at the said temperature without impairing the quality of the glass surface, part of the surface area of the glass sheet being contacted by a material constituting said surface and having a first coefficient of heat conductivity, and the remainder of the surface area of the glass sheet being contacted by a surface of a material having a second and lower coefficient of heat conductivity, whereby said remainder of the glass sheet is toughened to a lesser degree than the said part, for example to constitute a vision zone or zones, and maintaining a reference temperature to control the rate of heat flow through the heat-conducting material, thereby to establish a desired temperature difference between the respective parts of the surfaces of the glass and the corresponding interior portions of the glass when the glass is cooled through its strain point.

The areas of lesser degree of toughening may be extended areas such as to give in themselves a vision zone, or they may be strips or extended areas which are interspersed with other elongated areas of the higher degree of toughening so that the combination of the two degrees of toughening constitutes a vision zone.

As will be understood from the foregoing, preferably the material having the first coefficient of heat conductivity is graphite and the material having the lower heat conductivity is glass fibre cloth impregnated and coated with graphite.

In order to avoid deterioration of the surfaces of the heat-conducting material during operation of the process, the heat-conducting material may be brought into thermal contact with the glass sheet in a non-oxidising atmosphere to effect the toughening operation.

The method of the present invention is readily effected on a heated glass sheet suspended by tongs and, in such a case, the part of the glass sheet which is held by the tongs is not in contact with the heat-conducting material, and this small part of the glass sheet is therefore not toughened to the same extent as the remainder of the glass sheet.

However, thermal contact between the surfaces of the glass sheet and the heat-conducting material is accomplished in accordance with another aspect of the invention by heating a glass sheet while this is supported on a gaseous support, for example a gas cushion, and then the gaseous support or gas cushion is collapsed to effect a toughening of the glass sheet in accordance with the present invention.

According to this aspect, therefore, the present invention further comprises a method of toughening glass in sheet form comprising the steps of supporting a glass sheet on a gas cushion, heating the glass sheet to a temperature above the strain point of the glass while the glass sheet is supported on the gas cushion, then contacting each surface of the glass sheet with a heat-conducting material having substantially smooth contacting surfaces and capable of contacting the glass surface at the said temperature without impairing the quality of the glass surface, and maintaining a reference temperature to control the rate of heat flow through the heat-conducting material, thereby to establish a desired temperature difference between the surfaces of the glass and an interior portion of the glass when the glass is cooled through its strain point.

Desirably the glass sheet is advanced through a zone in which it is heated while supported on a gaseous support and is then advanced from this heating zone to a quenching zone where the toughening in accordance with the present invention is accomplished. According to this aspect, therefore, the present invention comprises a method of toughening glass in sheet form comprising the steps of advancing a glass sheet on a gaseous support through a heating zone wherein the glass is heated to a temperature above the strain point of the glass, advancing the glass sheet on a gaseous support from said heating zone to a chilling zone wherein the glass is momentarily supported on a gaseous support, collapsing said gaseous support in the chilling zone to bring one surface of the glass sheet into contact with a heat-conducting material, and simultaneously contacting the other surface of the glass sheet with a heat-conducting material, the heat-conducting material having substantially smooth contacting surfaces and being capable of contacting the glass surface at a temperature above the strain point of the glass without impairing the quality of the glass surface, and maintaining a reference temperature to control the rate of heat flow through the heat conducting material contacting the upper and lower surfaces of the glass sheet, thereby to establish a desired temperature difference between the surfaces of the glass and an interior portion of the glass when the glass is cooled through its strain point.

An alternative method of operation in accordance with the present invention is one in which a glass sheet is supported edgewise on a solid support and maintained in a predetermined plane intersecting the plane of the support while the glass sheet is heated to a temperature above the strain point of the glass and the glass sheet is toughened in accordance with the present invention by bringing the heat-conducting surfaces into contact with the surfaces of the glass sheet in that predetermined plane.

According to this aspect, therefore, the present invention provides a method of toughening glass in sheet form comprising the steps of supporting a glass sheet edgewise on a solid support, maintaining the glass sheet in a predetermined plane intersecting the plane of the support when the glass sheet is heated to a temperature above the strain point of the glass, then contacting each surface of the glass sheet in said predetermined plane with a heat-conducting material having substantially smooth contacting surfaces and capable of contacting the glass surface at the said temperature without impairing the quality of the glass surface, and maintaining a reference temperature to control the rate of heat flow through the heat-conducting material, thereby to establish a desired temperature difference between the surfaces of the glass and an interior portion of the glass when the glass is cooled through its strain point.

Advantageously in accordance with this aspect of the invention, the glass sheet is supported vertically on a conveyor and advanced through a heating zone and into a quenching zone in which the quenching of the glass sheet by contact with the heat-conducting surfaces is accomplished.

Preferably in accordance with this aspect of the invention therefore there is provided a method of toughening glass in sheet form comprising the steps of supporting a glass sheet edgewise on a conveyor with the lower edge only of the sheet supported by the conveyor, advancing the glass on the conveyor through heating and quenching zones, heating the glass sheet during its advance through the heating zone to a temperature above the strain point of the glass, maintaining the glass sheet balanced in a substantially vertical plane on the conveyor by providing mobile layers of gas under pressure and constituting cushions of gas simultaneously in contact with at least a part of each of the faces of the glass sheet, while the glass sheet is advanced through the heating zone and into the quenching zone, then in the quenching zone contacting each surface of the glass sheet with a heat-conducting material having substantially smooth contacting surfaces and capable of contacting the glass surface at the said temperature without impairing the quality of the glass surface, and maintaining a reference temperature to control the rate of heat flow through the heat-conducting material, thereby to establish a desired temperature difference between the surfaces of the glass and an interior portion of the glass when the glass is cooled through its strain point.

The method of the present invention has application in the toughening of glass sheets which are planar glass sheets and also in the toughening of curved glass sheets. When the glass sheet desired is a curved toughened glass sheet, the glass sheet may be previously bent before the commencement of the toughening step wherein the surfaces of the glass sheet are contacted by the contacting surfaces of the heat-conducting material, and in this case, as well as in the case where a planar toughened glass sheet is desired, the contacting surfaces conform to the surfaces of the glass sheet to be toughened. Alternatively when a curved toughened glass sheet is desired, the curvature may be imparted to the glass sheet, particularly if the curvature required is only a slight curvature, by the action of the smooth contacting surfaces of heat-conducting material during the toughening step.

Advantageously therefore when the desired product is a curved glass sheet, the glass sheet is pre-bent before being subjected to the toughening process in accordance with the present invention. However, when curvature is applied to the glass sheet simultaneously with toughening of the glass by the method of the present invention, it will be appreciated that the pressure contact between the surfaces of the glass sheet and the smooth contacting surfaces of the heat-conducting material must be greater, and therefore there is is a greater risk of marking the surfaces of the glass sheet. It is for this reason that it is preferred that, when a curved toughened glass sheet is desired, the glass sheet shall be pre-bent before being subjected to a toughening process in accordance with the invention.

The present invention also comprehends apparatus for toughening glass in sheet form comprising opposed bodies of a graphite-containing heat-conducting material capable of contacting the glass surface when the glass is at a temperature above its strain point without impairing the quality of the glass surface, the bodies having substantially smooth contacting surfaces, and means for maintaining a desired reference temperature to control the rate of conduction of heat through each of the said bodies from the glass sheet.

More particularly according to this aspect, the present invention provides apparatus for toughening glass in sheet form comprising opposed graphite slabs capable of contacting the glass surface when the glass is at a temperature above its strain point without impairing the quality of the glass surface, the graphite slabs having substantially smooth contacting surfaces, each of the said graphite slabs being secured in heat-conducting relation with metallic blocks, and the respective metallic blocks including on the side remote from the said graphite slabs a cooling circulation system through which a cooling fluid may be circulated to maintain a desired reference temperature and to control the rate of conduction of heat through the graphite slab and the metal block.

As already mentioned, the graphite slabs preferably have machined surfaces which comprise the substantially smooth contacting surfaces.

For the preparation of apparatus for toughening a glass sheet in accordance with the present invention to produce a toughened glass sheet with a reserved zone of a lesser degree of toughening, the slabs of heat-conducting material each have substantially smooth contacting surfaces at two distinct levels, each level being in itself a substantially smooth surface.

Other materials may be employed to form the substantially smooth surfaces contacting the glass sheet, and it is possible for the aluminum itself to contact the glass, although a polished aluminum surface should preferably be used. Alternatively, other forms of carbon may be used to form the substantially smooth contacting surfaces.

The present invention further comprehends apparatus for toughening glass in sheet form comprising a pair of metallic blocks capable of being situated facing opposed surfaces of the glass sheet to be toughened, each metallic block having on the side remote from the glass sheet to be toughened a cooling circulation system through which a cooling fluid may be circulated to maintain a desired reference temperature, each metallic block having, in heat-conducting relation to it on the side nearer to the glass sheet, a slab of material having a lower heat conductivity than the metal of the block and each slab having in heat-conducting relation to its surface nearest to the glass sheet to be toughened a layer of material having a heat conductivity lower than the heat conductivity of said slab, said layer of material being treated to render the surface capable of contacting the glass surface when the glass is at a temperature above its strain point without impairing the quality of the glass surface.

More particularly according to this aspect of the present invention, there is provided apparatus for toughening glass in sheet form comprising opposed layers of glass fibre cloth for contacting the surfaces of the glass sheet, the surfaces of the glass fibre cloth which will contact the surfaces of the glass being impregnated with a graphite dispersion to minimize the possibility of marking of the surfaces of the glass sheet by contact with the said glass fibre cloth, each of the layers of glass fibre cloth being secured in heat conducting relation with the surfaces of a graphite slab, each graphite slab being in turn in heat conducting relation with a metallic block, and the respective metallic blocks including on the side remote from the said graphite slabs a cooling circulation system through which a cooling fluid may be circulated to maintain a desired reference temperature and to control the rate of conduction of heat from the glass sheet through the system comprising the layer of glass fibre cloth, the graphite slab and the metallic block.

Advantageously the layer of glass fibre cloth has a thickness between 1 and 5 thousandths of an inch, each graphite slab has a thickness of the order of 0.4–0.5 inch and the metallic blocks are blocks of aluminium or copper of about one inch thickness.

In order to carry out a method of manufacturing a toughened glass sheet having areas of different degrees of toughening in which all of the surface of the glass is contacted by a heat conducting material containing graphite as previously described, the present invention further comprehends apparatus for toughening glass in sheet form comprising a pair of metallic blocks capable of being situated facing opposed surfaces to be toughened, each metallic block having on the side remote from the glass sheet to be toughened a cooling circulation system through which a cooling fluid may be circulated to maintain a desired reference temperature, each metallic block having in heat-conducting relation to it on the side nearer to the glass sheet a slab of material having a lower heat conductivity than the metal of the block, and areas of the slabs of heat conducting material corresponding to areas of the glass sheet which are desired to be toughened to a lesser degree than the remainder of the glass sheet, having as the surface which will contact the surface of the glass a surface of a material of a still lower conductivity than the conductivity of the slab, the whole surface, comprising the slab and the material of still lower conductivity, being a substantially plane surface capable of contacting the glass surface when the glass is at a temperature above its strain point without impairing the quality of the glass surface.

Preferably the blocks are made of copper or aluminum, the slab is made of graphite and the material of still lower heat conductivity than the graphite is glass fibre cloth impregnated with graphite dispersion.

The slab of graphite preferably has a thickness of the order of 0.4 to 0.5 inch and the areas which present to the glass a surface of glass fibre cloth impregnated with graphite dispersion, are comprised by layers having a thickness of the said glass fibre cloth within the range 1–5 thousandths of an inch, preferably 3 thousandths of an inch.

The present invention also comprehends glass in sheet form whenever toughened by a method in accordance with this invention.

The method according to the invention may be applied to the toughening of glass sheets of any thickness, but it has particular application in the toughening of thin glass sheets, for example sheets of glass of a thickness of only three thirty-seconds of an inch, and the preferred method in accordance with the present invention provides a good way of toughening such thin glass sheets without impairing their surface.

Figure 2:
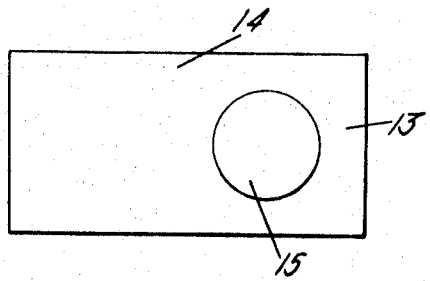
Figure 5:
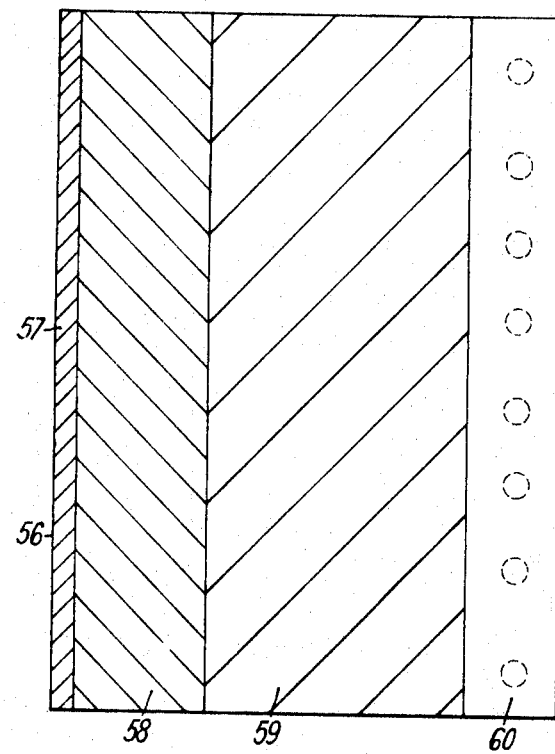
Figure 6:
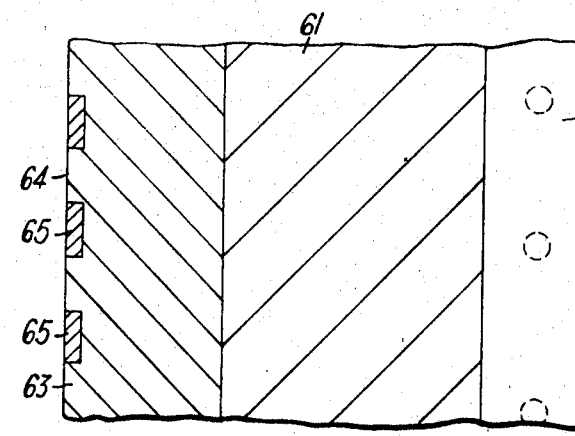

In order that the present invention may be more clearly understood, the following detailed description of preferred embodiments thereof is made, by way of example, with reference to the accompanying diagrammatic drawings in which:

FIGURE 1 shows a heated glass sheet being held by apparatus in accordance with the present invention, FIGURE 2 shows a front view of one slab of heat-conducting material having a machined face for forming in the toughened glass sheet a reserved zone of a lesser degree of toughening, FIGURE 3 shows diagrammatically apparatus wherein the glass sheet is heated while it is supported on an air cushion, and the heated glass sheet is then toughened by thermal contact with heat-conducting material, FIGURE 4 shows diagrammatically apparatus wherein the glass sheet is balanced vertically edgewise on a conveyor while it is heated and then toughened by frictional contact with heat-conducting material, FIGURE 5 shows a section through a modified form of chilling apparatus in accordance with the present invention, and FIGURE 6 shows a section through a part of an apparatus for obtaining different degrees of toughening in different parts of the glass sheet.

In the drawings, like reference numerals designate the same or similar parts.

Referring to FIGURE 1 of the drawing, the apparatus is shown in the position in which a glass sheet 1 which is suspended by tongs 2 is actually being quenched by a method in accordance with the invention.

Opposed slabs 3 of graphite have substantially smooth surfaces 4 conforming to the surfaces of the glass sheet 1. The graphite slabs 3 have incorporated in them an oxygen-resistant binder, for example a clay binder. The surfaces 4 are in contact with the surfaces of the glass sheet 1, the pressure between the surfaces being of the order of 3 lbs. per square inch so that in fact the contact between the surfaces of the glass sheet 1 and the substantially smooth contacting surfaces 4 of the graphite slabs 3 is only a partial contact, for example about 10% to 20% actual contact.

The graphite slabs 3 which are of a thickness of about 1 cm. are mounted on solid aluminum blocks 5 of a thickness of about 1".

At the rear of each aluminum block 5 is a cooling circulation system 6 through which cooling water is passed to maintain the rear surfaces of the aluminium blocks 5 at a constant reference temperature, for example 50° C. The cooling circulation system 6 may be included actually in the aluminium blocks 5 or may be in a separate chamber secured to the backs of the aluminium blocks 5.

The whole cooling system comprising the graphite slabs 3, the aluminium blocks 5 and the cooling circulation system 6 is mounted to be advanced and retracted on a member 7 by actuating means 8, which may be a motor.

Conveniently, in operation, the suspended glass sheet 2 is raised from a furnace, not shown, in which the glass sheet is heated to a temperature of the order of 700° C. and is raised optionally through a bending station at which a desired curvature may be imparted to the glass sheet to a position between the quenching apparatus comprising the slabs 3, the blocks 5 and the cooling circulation system 6.

At this time the chilling apparatus is in a retracted position, but as soon as the glass is stationary between the opposed chilling means, these are advanced by a member 7 operated from the motor 8 to a precisely determined position in which the substantially smooth surfaces 4 of the slabs 3 contact the surfaces of the glass sheet with the desired pressure of the order of 3 lbs. per square inch.

After a period of approximately ten seconds, the opposed chilling means are retracted by the member 7 and the motor 8 to permit removal of the toughened glass sheet 1 and its replacement by another heated glass sheet.

The substantially smooth contacting surfaces 4 of the slabs 3 of heat conducting material will be at a temperature of the order of 300° C. when the surfaces 4 are brought into contact with the surfaces of a heated glass sheet 2 of a thickness of 3/8". This temperature is naturally maintained by the surfaces 4 in continuous operation of the apparatus, but when the process is being started up, it is desirable for the contacting surfaces 4 of the graphite slabs 3 to be heated before any toughening of glass sheets takes place. In this way, shattering of the glass sheets during the starting-up stage of the process may be substantially avoided.

The temperature of the glass sheet when it is contacted by the substantially smooth surfaces 4 of the graphite slabs 3 is generally of the order of 680° C.

For different thicknesses of glass sheet, the apparatus and conditions of operations are varied to provide different temperatures at the surfaces of the heat-conducting material. For example, for glass of 1/4 inch thickness, the surfaces 4 are at a temperature of the order of 200° C., and for glass of 1/8 inch thickness the surfaces 4 are maintained at a still lower temperature, between about 50° and 100° C. It is preferred, however, for the surfaces 4 to be maintained at temperatures greater than those mentioned when the glass sheet is bent as well as toughened by contact with the surfaces 4.

It will be appreciated that the graphite slabs 3 must be cut away so as not to impinge on the tongs 2 which carry the glass sheet 1, but it is found that good toughening in the glass sheet is obtained using apparatus substantially as described with reference to FIGURE 1 of the accompanying drawings.

The substantially smooth contacting surfaces 4 of the graphite slabs 3 may each have a corresponding curvature, for example the curvature of the arc of a circle of radius 100", and when such curved surfaces 4 are brought into contact with a plane glass sheet 1, the glass sheet will be bent to a curvature similar to that of the surfaces 4 at the same time that the graphite slabs 3 are acting to toughen the glass. As already mentioned, the curved surfaces 4 are maintained in operation at temperatures substantially higher than the temperatures at which planar surfaces 4 are maintained.

In a modification of the operation of the apparatus shown in FIGURE 1, the actuating means 8 is arranged to advance the whole cooling system into contact with the heated glass sheet 1, and to apply to the surfaces of the glass sheet a pressure of about 3 lbs. per square inch, and this pressure is maintained for approximately five seconds. At the end of the period of five seconds, the actuating means 8 applies the whole cooling system to the surfaces of the glass sheet 1 at an increased pressure of 15 lbs. per square inch, and this increased pressure is maintained for a period of a further five seconds, after which the whole cooling system comprising the graphite slabs 3, the aluminium blocks 5 and the cooling circulation system 6 is retracted by the actuating means 8 through the member 7.

Referring now to FIGURE 2, there is shown a front view of another slab of graphite 13 which is similarly mounted on an aluminium block 5 with a cooling circulation system 6. However, the surface 14 of the graphite slab 13 is a heat-conducting surface exhibiting a main level of the surface 14 and a different level over a roughly circular area 15. The level of the area 15 is about two thousandths of an inch recessed in the substantially smooth level surface 14, and the recessed surface 15 is also a substantially smooth level surface.

The opposed graphite slab 13 has a corresponding recessed area 15 so that when the two slabs 13 are brought into thermal contact with opposed surfaces of the heated glass sheet, the areas 15 are directly opposite one another through a part of the heated glass sheet.

The graphite slabs 13 are applied to the surfaces of the heated glass sheet 1 with pressures of the order of 3 lbs. per square inch, and this is the pressure existing between the surface 14 and the surface of the heated glass sheet. On account of the recess in the area 15, which is itself a substantially smooth surface, the pressure existing between the surface area 15 and the heated glass sheet is lower, and there may be no pressure at all in this area. Heat conduction from the glass through the area 15 occurs on account of the proximity of the one to the other even when there is no pressure contact. However, the rate of heat conduction from the glass sheet by the area 15 is less than the rate of conduction of heat from the remainder of the glass sheet by the area 14 of the graphite slab 13, and the degree of toughening obtained in the glass opposite the area 15 is substantially less than the degree of toughening obtained in the remainder of the glass sheet which is in contact with the area 14.

Advantageously the method is carried out in a nitrogen atmosphere, which is a non-oxidising atmosphere, so that the surfaces of the graphite slabs 3 and 13 do not deteriorate through repeated operation of the process.

Referring now to FIGURE 3 of the accompanying drawings, there is shown diagrammatically apparatus including a heating zone 21 in which a glass sheet is heated while the glass sheet 22 is supported on a gas cushion formed by the passage through a porous tile 23 of air heated to a temperature of the order of 700° C.

The air which constitutes the gas cushion supporting the glass sheet 22 during heating is supplied through a conical inlet tube 24 past a plurality of heating elements 25 which impart heat to the air.

The porous tile 23 itself becomes heated to a temperature of the order of 650° C. and the porous tile by radiation, and the hot air constituting the gaseous cushion or support by conduction, supply heat to the lower surface of the glass sheet 22. Radiant heaters 26 within a roof structure 27 supply heat to the upper surface of the glass sheet 22.

The glass sheet 22 is supplied to the heating zone 21 through an inlet 28 and becomes supported in the heating zone solely by a gas cushion present over the porous ceramic tile 23. The porous tile 23 is inclined at an angle to the horizontal, the slope of the tile 23 being about half a degree from left to right as seen in FIGURE 3. Movement of the glass sheet 22 through the heating zone down the slope of the tile under gravity is controlled by a physical stop 29 which is moved into the path of the glass sheet 22 through a side wall of the roof structure over the heating zone 21 to prevent the glass sheet 22 passing out of the heating zone 21 before it has been properly heated.

When the glass sheet 22 is sufficiently heated, that is to say to a temperature of approximately 680° C., the stop 29 is withdrawn and the heated glass sheet 2 is permitted to move down the incline of the gaseous support over the porous tile 23 to emerge through an outlet 30 from the heating zone to be supported over a porous graphite tile 31 by a cushion of air supplied to the underside of the porous tile 31 through a tube 32. The heated glass sheet is similarly stopped on the air cushion over the porous tile 31 by a stop 33.

Immediately the heated glass sheet is at rest over the porous tile 31, the gas supplied through the tube 32 is cut-off by the tap 34 so that the gas cushion is collapsed and the heated glass sheet falls into contact with the graphite slab 31. Simultaneously a second graphite slab 35 is brought down on the upper surface of the glass sheet so that both surfaces of the glass sheet 22 are contacted by graphite slabs and the glass sheet is chilled by the conduction of heat therefrom through graphite slabs.

The graphite slab 35 is mounted on an aluminium block 36 having at its rear a circulation system 37 similar in all respects to the graphite slab 3, the aluminium block 5 and the water circulation system 6 of FIGURE 1. The whole chilling system comprising the graphite slab 35, the aluminium block 36 and the water circulation system 37 is moved on a member 38 by actuating means such as a motor 39.

The control of the rate of heat conduction from the lower surface of the glass sheet by the porous graphite slab 31 is also controlled by the existence of the aluminium block 40 and the water circulation system 41 behind the graphite slab 31. However, in order to supply gas to the porous graphite slab 31, tubular passages 42 through the water circulation system 41 and the aluminium block 40 are provided for leading air from the tube 32 to the porous graphite slab 31.

It will be appreciated that the gas cushion over the porous graphite slab 31 is not such a good gas cushion as that present over the porous ceramic tile 23, but it is sufficient to enable the glass sheet 22 to be advanced over the graphite slab 31 without suffering any surface damage before the cushion over the graphite slab 31 is collapsed.

Referring now to FIGURE 4 of the accompanying drawings, there is shown a conveyor for a glass sheet, the conveyor comprising a series of rollers 45 and a member 46 adapted to support a glass sheet 47 with the lower edge of the glass sheet only in contact with the solid supporting member 46.

The glass sheet 47 is advanced by the conveyor between opposed blowing boxes 48, of which only the boxes on the far side of the glass sheet in FIGURE 4 are shown, for clarity in that figure. The opposed blowing boxes 48 are arranged to direct gas streams towards the opposite surfaces of the glass sheet to provide mobile layers of gas under pressure and in contact with the surfaces of the glass sheet and constituting cushions of gas in contact with the surfaces of the glass sheet. The glass sheet will thus be balanced in a vertical position on the support member 46 as it is conveyed between the opposed gas boxes 48.

During the passage of the glass sheet 47 between the opposed blowing boxes 48, heat is supplied to the glass by the electric heating elements 49 which are positioned behind the narrow gas boxes 48 so that they direct heat through the gaps between the gas boxes on to the glass sheet as it progresses through the heating zone.

Furthermore the cushions of gas under pressure which balance the glass sheet in the vertical position in the heating zone between the gas boxes 48 are maintained by streams of gas, for example air, at a temperature in the range of 600° C. to 800° C., and so assist in bringing the glass to a temperature above its strain point.

As the glass sheet is advanced along the conveyor in the direction of the arrow 50, it reaches a position at which the glass sheet, instead of being between opposed gas boxes 48, is between opposed porous tiles 51.

Air is passed through each of the porous tiles 51 to maintain air cushions adjacent the glass sheet as it enters the space between the opposed porous tiles 51.

Each of the porous tiles 51 is mounted on an aluminium block 52 to the other side of which a water circulation system 53 is secured. The air is supplied to the porous graphite slab 51 through tubular passages 54 passing through the water circulation system 53 and the aluminium block 52.

Consequently the glass sheet 47 is maintained vertical by the gases passing through the respective porous tiles 51 as the glass sheet enters the space between the two porous tiles 51.

When the glass sheet 47 is completely between the two porous tiles 51, the advance of the glass sheet on the conveyor is ceased so that the glass sheet 47 is brought to rest, and at the same time the supply of air through the porous tiles 51 is cut off and the two assemblies including the porous tiles 51, the aluminium blocks 52 and the water circulation system 53 are advanced towards one another so that the opposed surfaces 55 of the porous tiles 51 are brought into contact with the surfaces of the glass sheet to toughen the glass sheet in accordance with the method of the present invention, the rate of heat-conduction from the surfaces of the glass sheet being controlled in accordance with the thickness of each porous tile 51, each aluminium block 52 and the temperature maintained by the water circulation system 53.

Referring now to FIGURE 5 of the accompanying drawings there is shown a section through apparatus in which the actual surface which will contact the surface of the glass sheet is a surface 56 of a layer 57 of glass fibre cloth impregnated and coated with graphite. The layer 57 is of the order of 3 thousandths of an inch in thickness and is mounted in heat conducting relation with a graphite slab 58 approximately 0.4 inch in thickness which in turn is mounted in heat conducting relation with an aluminium block 59 about 1 inch in thickness.

At the rear of the aluminium block 59 there is a water circulation system 60 similar to those already described with reference to FIGURES 1, 3 and 4.

In FIGURE 6 of the accompanying drawings there is shown a section through a part of a chilling apparatus which is modified to produce in the toughened glass sheet, areas of respectively high and low degrees of toughening. In FIGURE 6 there is shown an aluminium block 61 having a water circulation system 62 to maintain a reference temperature at the rear of the block 61 and the other, or front, surface of the aluminium block 61 is in heat conducting relation with a graphite slab 63 secured thereto.

The smooth machined surface 64 of the graphite slab 63 is cut away to a depth of about 3 thousandths of an inch at parts of the surface corresponding to areas of the glass sheet where a lesser degree of toughening is to be produced and these cut away portions in the surface 64 are filled in with glass fibre cloth 65 impregnated with graphite so that the glass fibre cloth 65 presents a surface which is a continuation of the surface 64 of the graphite slab, and a substantially smooth surface is presented to the glass sheet being toughened.

Consequently, areas of a higher degree of toughening will be produced in those parts of the glass sheet which are contacted by the surface 64 of graphite and areas of a lesser degree of toughening will be produced in the parts of the glass sheet toughened by contact with the impregnated glass fibre cloth 65.

By the use of apparatus substantially as described with reference to the accompanying drawings, it is found that the toughened glass sheet obtained is more uniformly toughened than is the case when the glass is toughened by the action of a gaseous chilling medium in the conventional toughening process.

Furthermore, the process in accordance with the present invention enables the glass sheet to be toughened in a time of the order of ten seconds as opposed to a quenching time of twenty seconds when a gaseous chilling medium is used. Consequently the process in accordance with the invention is adapted to be used with improved electric furnaces in which the glass sheet is more quickly heated to the temperature at which toughening and/or bending are undertaken.

Graphite is the preferred material for contacting the surfaces of the glass sheet because any accidental indentation in the gaphite surface will not lead to marking of the glass surface. Furthermore, if there is any side slip between the graphite surface and the surface of the glass sheet, the glass sheet will not become marked because the graphite is effectively self-lubricating.

I claim:

1. A method of toughening glass in sheet form comprising the steps of bringing the opposite surfaces of a glass sheet at a temperature above the strain point of the glass into contact with solid cooling surfaces of heat-conducting material, and maintaining a reference temperature at the remote surfaces of said heat-conducting material to control the rate of heat flow from the glass, wherein a part of surface area of the glass is contacted by the surface of a part of said material having a first coefficient of heat conductivity, and the remainder of the surface area of the glass sheet is contacted by a surface of a part of said material having a lower coefficient of heat conductivity, whereby said remainder of the glass sheet is toughened to a lesser degree than the said part, for example to constitute a vision zone or zones.

2. In a method of toughening glass in sheet form in which the opposite surfaces of a glass sheet at a temperature above the strain point of the glass are brought into face-to-face contact with solid cooling surrfaces consisting of graphite-containing heat-conducting material, the steps of maintaining a reference temperature at the opposed surfaces of said heat-conducting material to control the rate of heat flow from the glass through the graphite-containing heat-conducting material, initially bringing said solid cooling surfaces into light pressure contact with the surfaces of the glass sheet, and when the surfaces of the glass sheet have cooled to a temperature at which they are not deformable, applying said solid cooling surfaces to the glass sheet at higher pressures, whereby an increased degree of toughening in the glass sheet is obtained without impairing the surfaces of the glass sheet.

3. A method of toughening glass in sheet form, comprising the steps of bringing the opposite surfaces of a glass sheet at a temperature above the strain point of the glass into face-to-face contact with solid cooling surfaces consisting of graphite-containing heat-conducting material, and maintaining a reference temperature at the opposed surfaces of said heat-conducting material to control the rate of heat flow from the glass through the graphite-containing heat-conducting material, wherein the surfaces of the graphite-containing heat-conducting material contact a part only of the heated glass sheet at a predetermined pressure, and the surfaces of the graphite-containing heat-conducting material are brought close to the surfaces of the other part of the glass sheet and are not in substantial contact therewith, whereby a reserved zone of a lesser degree of toughening is obtained.

4. Apparatus for toughening glass in sheet form comprising opposed graphite slabs having substantially smooth contacting surfaces and each secured in heat-conducting relation with metallic blocks, means for bringing said opposed bodies into thermal contact with the opposite surfaces of a glass sheet at a temperature above its strain point without impairing the quality of the glass surface, the respective metallic blocks including on the side remote from the said graphite slabs a cooling circulation system through which a cooling fluid may be circulated to maintain a desired reference temperature and to control the rate of conduction of heat through the graphite slab and the metal block.

5. The method according to claim 1, whereby the material having the first coefficient of heat conductivity is graphite, and the material having the lower heat conductivity is glass fibre cloth impregnated and coated with graphite.

6. Apparatus according to claim 4, wherein the metallic blocks are blocks of aluminium or of copper.

7. Apparatus according to claim 4, wherein each slab has in heat-conducting relation to its surface nearest to the glass sheet to be toughened a layer of material having a heat-conductivity lower than the heat-conductivity of said slab, said layer of material being treated to render the surface capable of contacting the glass surface when the glass is at a temperature above its strain point without impairing the quality of the glass surface.

8. Apparatus according to claim 7, including opposed layers of glass fibre cloth for contacting the surfaces of the glass sheet, the surfaces of the glass fibre cloth which will contact the surfaces of the glass being impregnated with a graphite dispersion to minimize the possibility of marking of the surfaces of the glass sheet by contact with the said glass fibre cloth.

9. Apparatus according to claim 8, wherein the layer of glass fibre cloth has a thickness between 1 and 5 thousandths of an inch, each graphite slab has a thickness of the order of 0.4–0.5 inch, and the metallic blocks are blocks of aluminium or copper of about one inch thickness.

References Cited

UNITED STATES PATENTS

| | | | |
|---|---|---|---|
| 2,470,461 | 5/1949 | Black | 65—24 X |
| 2,762,166 | 9/1956 | Vent | 65—114 X |
| 3,365,286 | 1/1968 | Nedelec | 65—104 |

FOREIGN PATENTS

| | | |
|---|---|---|
| 1,657 | 4/1877 | Great Britain. |

S. LEON BASHORE, Primary Examiner

ARTHUR D. KELLOGG, Assistant Examiner

U.S. Cl. X.R.

65—104, 288, 351, 356, 374